United States Patent
Miyashita

(10) Patent No.: US 7,618,179 B2
(45) Date of Patent: Nov. 17, 2009

(54) OPTICAL MEMBER, BACKLIGHT UNIT AND DISPLAY APPARATUS

(75) Inventor: Junji Miyashita, Fujiyoshida (JP)

(73) Assignee: Citizen Electronics Co., Ltd., Fujiyoshida-shi, Yamanashi-ken (JP)

( * ) Notice: Subject to any disclaimer, the term of this patent is extended or adjusted under 35 U.S.C. 154(b) by 0 days.

(21) Appl. No.: 12/115,260

(22) Filed: May 5, 2008

(65) Prior Publication Data

US 2008/0291359 A1 Nov. 27, 2008

(30) Foreign Application Priority Data

May 8, 2007 (JP) ............................. 2007-123767
May 8, 2007 (JP) ............................. 2007-123768

(51) Int. Cl.
*F21V 8/00* (2006.01)

(52) U.S. Cl. ....................... 362/609; 362/307; 362/309; 362/330

(58) Field of Classification Search ................. 362/307, 362/308, 309, 326, 327, 330, 331, 609
See application file for complete search history.

(56) References Cited

U.S. PATENT DOCUMENTS

| | | | | |
|---|---|---|---|---|
| 4,924,356 A | * | 5/1990 | French et al. | 362/607 |
| 6,527,410 B2 | * | 3/2003 | Yamaguchi | 362/243 |
| 7,156,546 B2 | * | 1/2007 | Higashiyama | 362/561 |
| 7,309,149 B2 | * | 12/2007 | Lee et al. | 362/339 |
| 2007/0002452 A1 | * | 1/2007 | Munro | 359/627 |

FOREIGN PATENT DOCUMENTS

| | | |
|---|---|---|
| JP | 5-94731 A | 4/1993 |
| JP | 2003-131202 A | 5/2003 |
| JP | 2006-66282 A | 3/2006 |
| JP | 2006-145653 A | 6/2006 |

* cited by examiner

*Primary Examiner*—Laura Tso
(74) *Attorney, Agent, or Firm*—Brinks Hofer Gilson & Lione

(57) ABSTRACT

An optical member enables a display apparatus to be improved in visibility of its display screen as viewed from a plurality of predetermined directions other than the directly forward direction. The optical member includes a lenticular lens member (3) having a plurality of convex lenses (2) and a light-reflecting layer (5) disposed on the back surface of the lenticular lens member. The light-reflecting layer (5) is provided with optical windows (6) each at a position corresponding to a midpoint between the apexes of mutually adjacent convex lenses. Light emitted from a planar light source, passed through each optical window (6), and configured to enter the mutually adjacent convex lenses (2) corresponding to the optical window is directed in mutually different directions by the mutually adjacent convex lenses, respectively.

20 Claims, 7 Drawing Sheets

[Fig. 1]
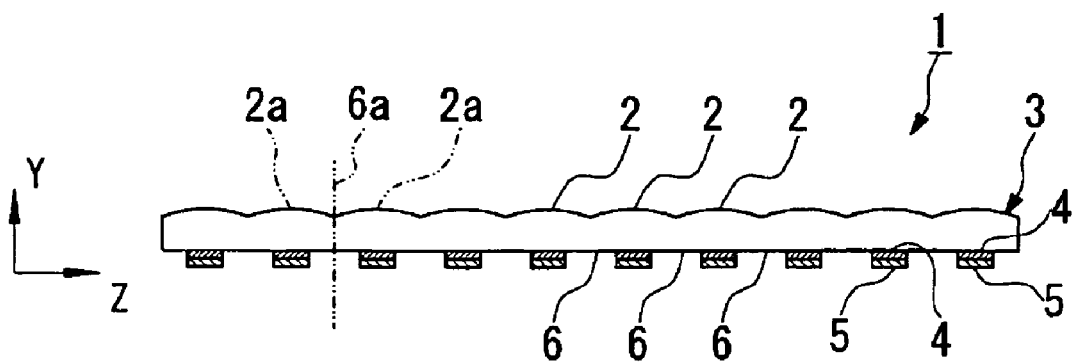
[Fig. 2]
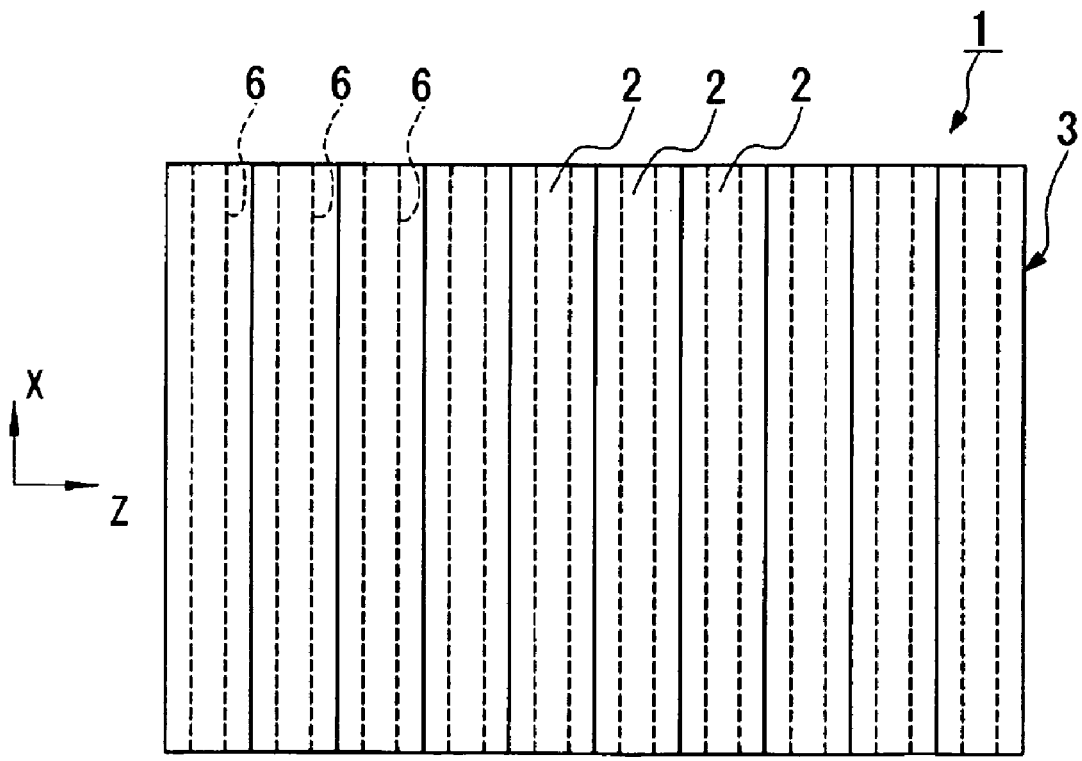

[Fig. 3]
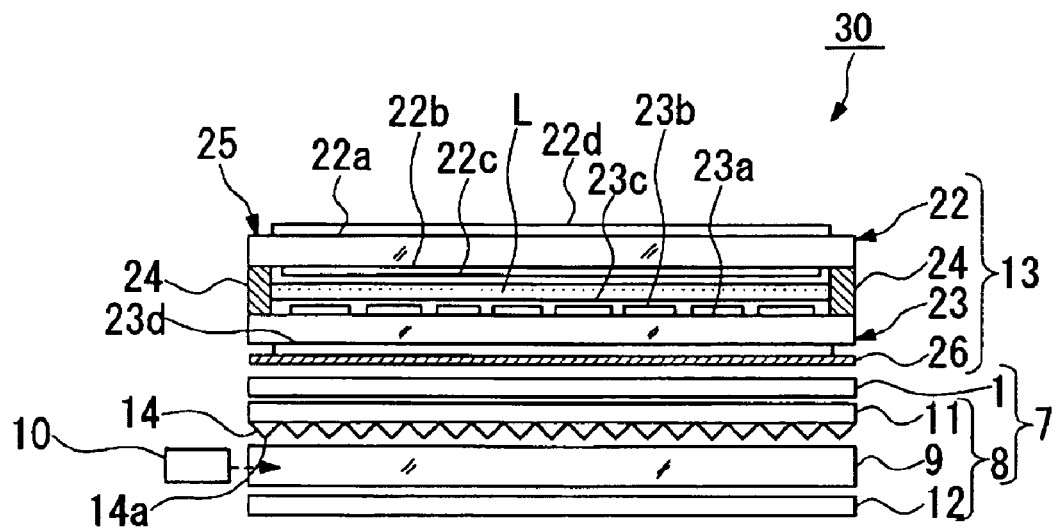
[Fig. 4a]
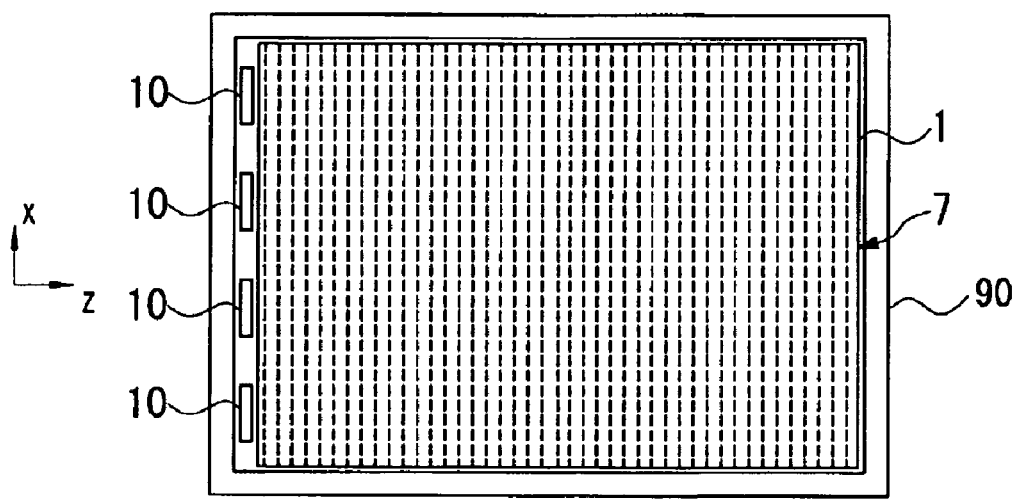
[Fig. 4b]
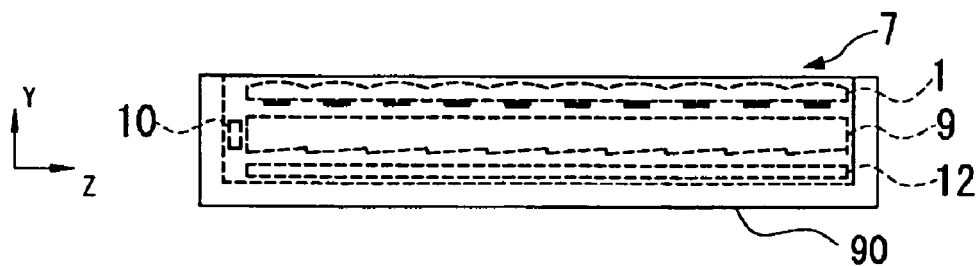

[Fig. 5]
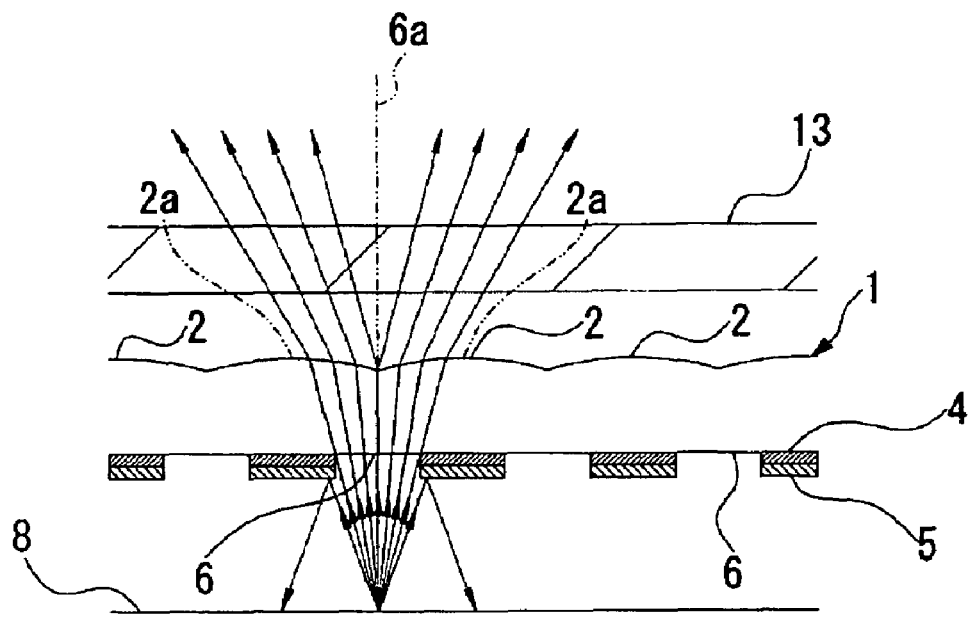
[Fig. 6]
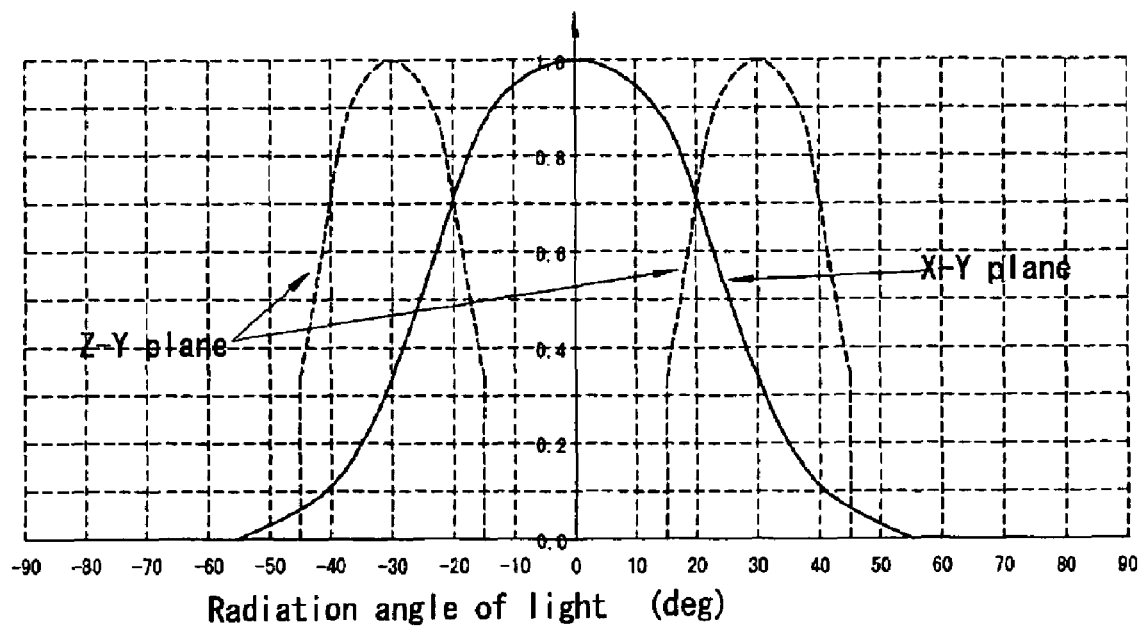
Radiation angle of light (deg)

[Fig. 7]
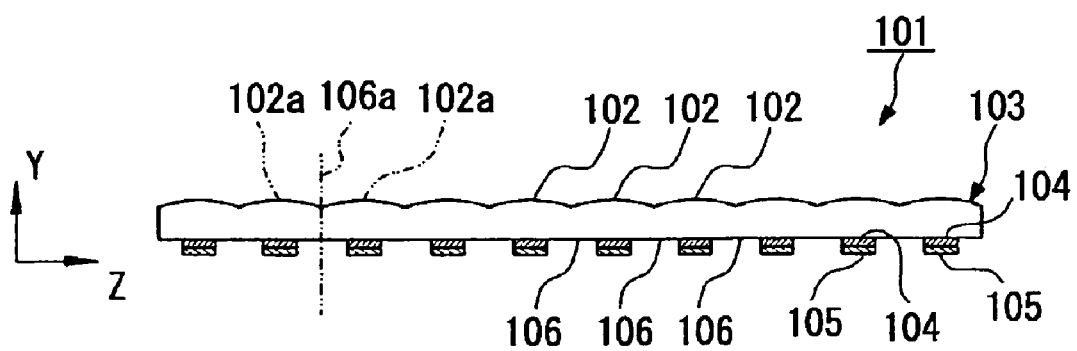
[Fig. 8]
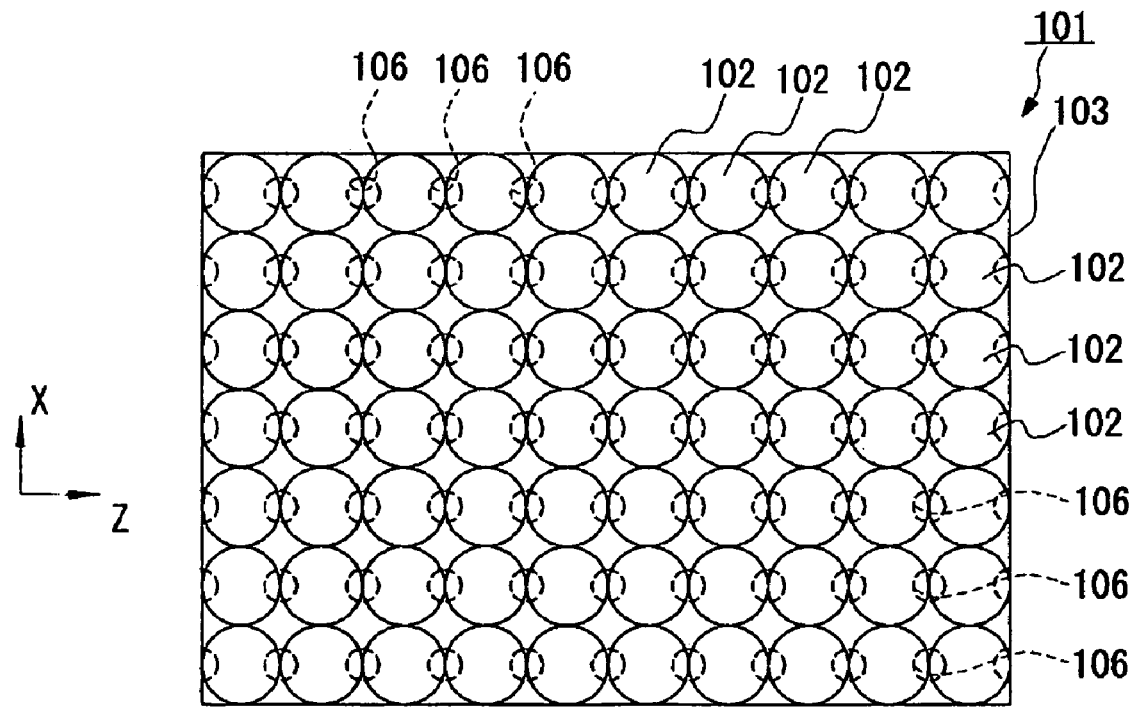

[Fig. 9]
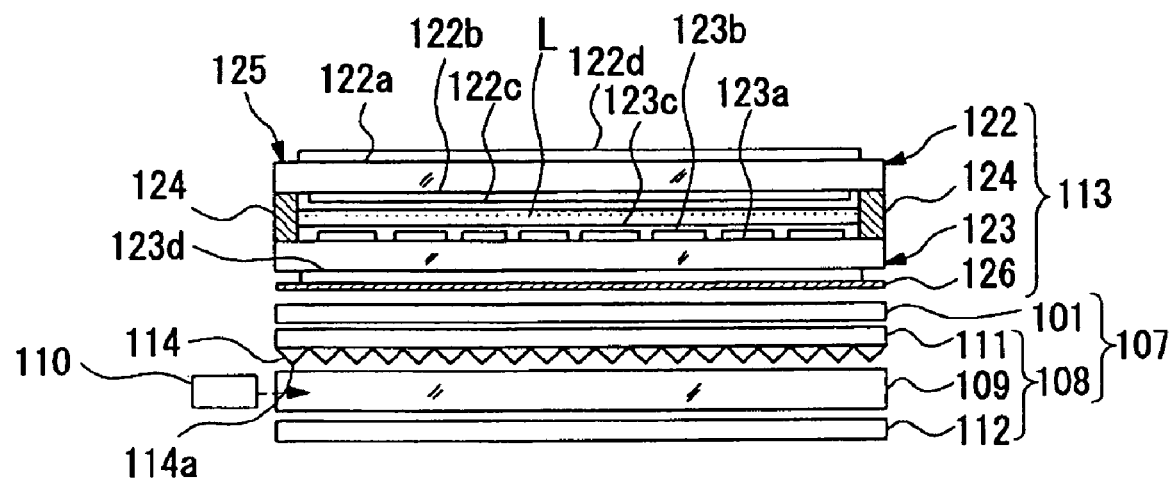
[Fig. 10a]
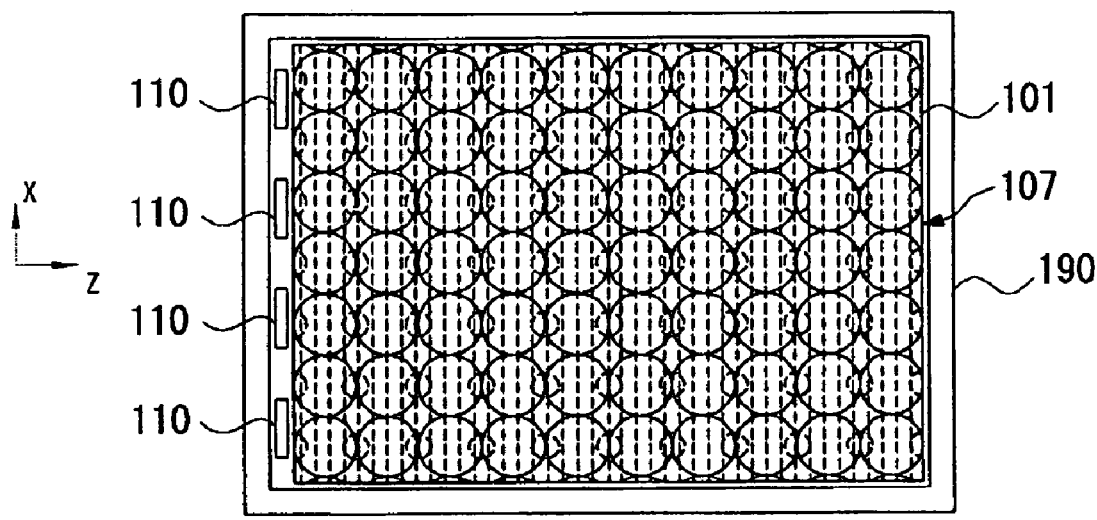
[Fig. 10b]
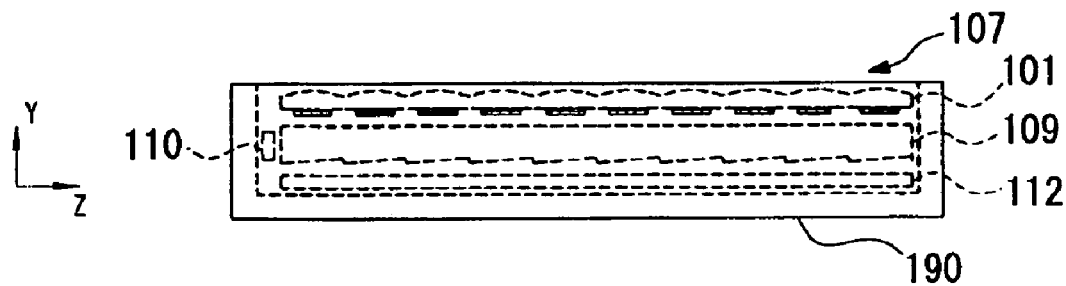

[Fig. 11]
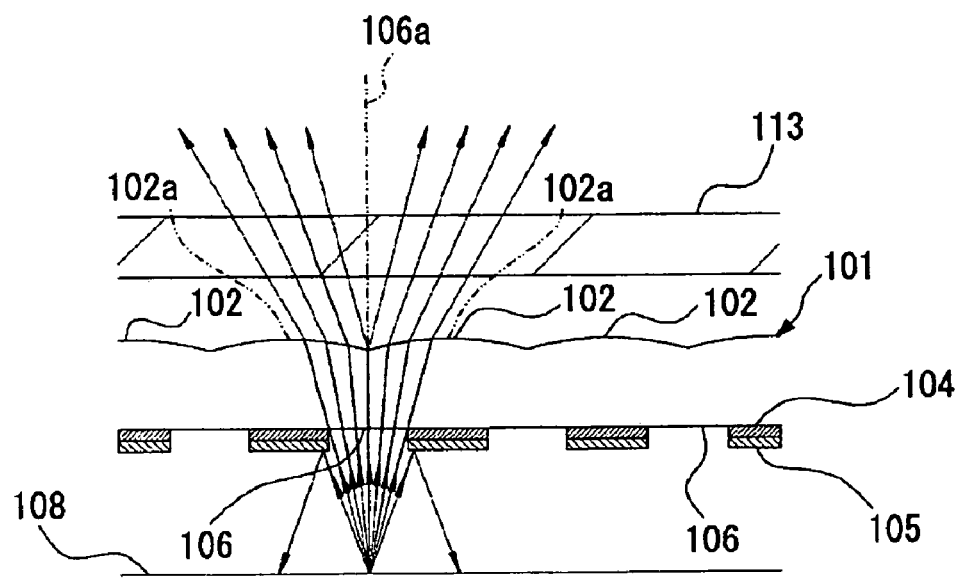
[Fig. 12]
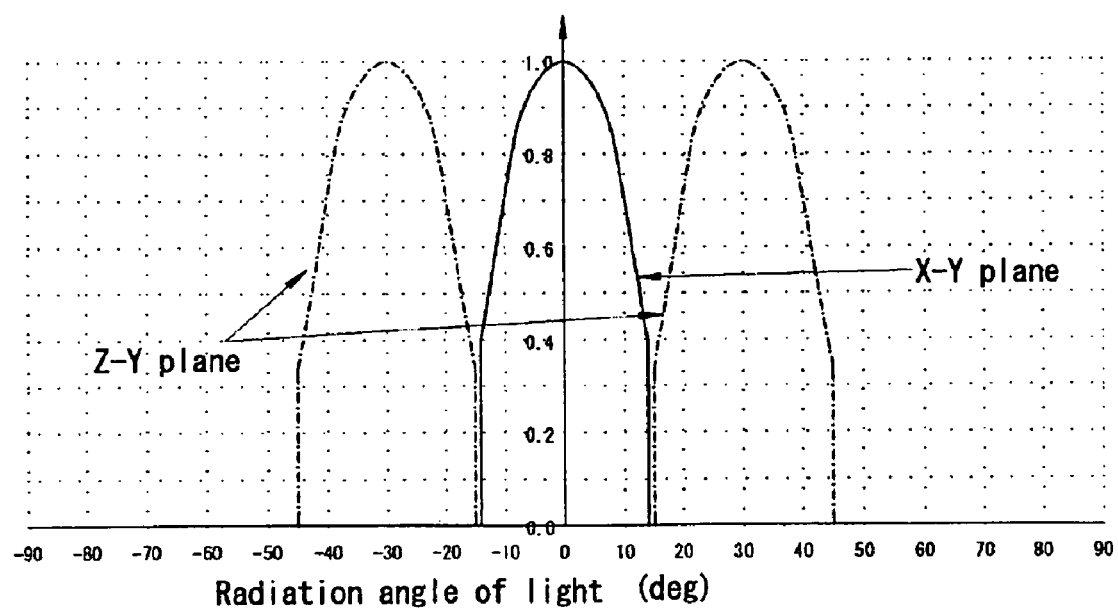

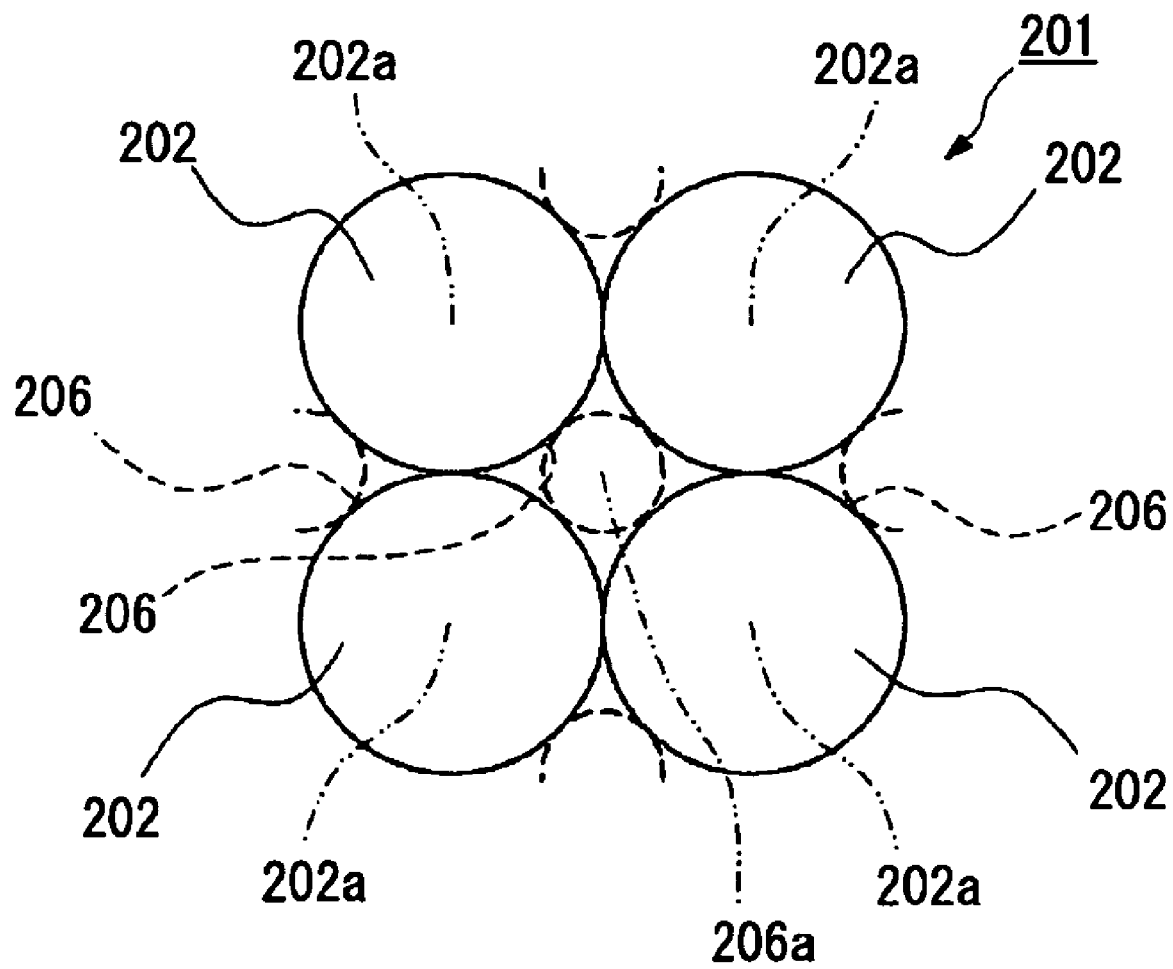
[Fig. 13]

OPTICAL MEMBER, BACKLIGHT UNIT AND DISPLAY APPARATUS

REFERENCE TO THE RELATED APPLICATIONS

This application claims priority under 35 U.S.C. § 119 to Japanese Patent application No. JP2007-123767 filed on May 8, 2007 and Japanese Patent application No. JP2007-123768 filed on May 8, 2007, the entire contents of which are hereby incorporated by reference.

TECHNICAL FIELD

The present invention relates to an optical member having directivity in two directions other than a directly forward direction, for example, and also relates to a backlight unit and a display apparatus that use the optical member.

RELATED PRIOR ART

Liquid crystal display apparatus for image display have been widely used in mobile phones, personal digital assistants (PDAs), automated teller machines (ATMs), displays of personal computers and car navigation systems, etc. These liquid crystal display apparatus employ a backlight unit that applies illuminating light to a liquid crystal display panel from the back thereof to enhance the luminance of the display screen.

Recently, there has been a demand that liquid crystal display apparatus should be improved in visibility of the display screen as viewed from a predetermined direction according to the use environment of the apparatus.

For example, Japanese Patent Application Publication No. Hei 5-94731 proposes an antiglare sheet of silicone rubber for an illuminated display that comprises a repeated pattern of elongated white, black, transparent and black portions. The antiglare sheet suppresses diffusion of light by the light-blocking effect of the black portions. That is, this antiglare sheet is usable as a peep preventing sheet that allows an individual to see the liquid crystal display of a mobile phone or to operate on the operating screen of an ATM at a bank or the like privately without another person peeping sideways at information displayed on the display screen during use.

Japanese Patent Application Publication No. 2003-131202 proposes a peep preventing member for an information display that has an antiglare layer formed by alternately arranging a plurality of transparent silicone rubber sheets and colored silicone rubber sheets into an integrated layer.

Meanwhile, Japanese Patent Application Publication No. 2006-145653 proposes an optical member sheet that is usable in place of a prism sheet of a backlight unit. The optical member sheet comprises a light-transmitting resin substrate having a series of convex lens-shaped elements formed on one surface thereof and further comprises a reflecting layer provided on the other surface of the light-transmitting resin substrate, the reflecting layer is configured to correspond to the boundary between each pair of mutually adjacent convex lens-shaped elements. In this optical member sheet, rays of emitted light are collected in a directly forward direction relative to a display surface by the plurality of convex lens-shaped elements, thereby improving the luminance of the display surface.

Japanese Patent Application Publication No. 2006-66282 proposes a backlight unit in which two light sources are disposed adjacent to two mutually opposing side edge surfaces, respectively, of a lightguide plate, and optical reflecting grooves each having a substantially triangular sectional configuration are provided on a lower surface of the lightguide plate (i.e. a surface thereof that faces away from a display). In this backlight unit, one of two slant surfaces that define each optical reflecting groove is a smooth surface, and the other of the two slants surfaces is a rugged surface. The backlight unit allows choice between two directivity characteristics by switching between the two light sources. That is, when light from one light source is made incident on and reflected from the smooth surfaces, exiting light from the lightguide plate has high directivity. When light from the other light source is made incident on and reflected from the rugged surfaces, exiting light from the lightguide plate has low directivity.

SUMMARY OF THE INVENTION

The above-described conventional techniques, however, still have the following problems to be solved.

Recently, there has been a demand that liquid crystal display apparatus should be improved in visibility of the display screen as viewed from a plurality of directions other than a directly forward direction according to the use environment of the apparatus. In the case of a car navigation system, for example, the display is generally installed in the center of the instrument panel of a vehicle, i.e. between the driver's seat and the passenger's seat. Therefore, the display screen is demanded to provide high visibility when it is viewed obliquely sideways, i.e. when it is seen from both the driver in the driver's seat and the occupant in the passenger's seat, by increasing the luminance of the display surface as viewed from the two directions. In this regard, the first three of the above-described known techniques can improve the visibility of the display screen as viewed from one direction, e.g. from the directly forward direction, but cannot improve the visibility from a plurality of arbitrary directions. The last of the foregoing known techniques can switch between high directivity and low directivity in the directly forward direction but can only obtain directivity having one peak in the directly forward direction in either case. That is, it cannot increase the directivity in two directions other than the directly forward direction.

The present invention has been made in view of the above-described circumstances. Accordingly, an object of the present invention is to provide an optical member that allows light exiting a display screen to have high directivity in a plurality of predetermined directions other than the directly forward direction relative to the display screen and that suppresses emission of light in directions other than the predetermined directions. Another object of the present invention is to provide a display apparatus capable of providing a display screen of high luminance and high visibility as viewed from a plurality of predetermined directions by using the optical member of the present invention. Still another object of the present invention is to provide a backlight unit having the optical member of the present invention and used in the display apparatus of the present invention.

The present invention provides an optical member including a transparent member having a back surface disposed parallel to a planar light source and a front surface opposite to the back surface. The transparent member has a plurality of convex lenses formed on the front surface. The optical member further includes a light-reflecting layer disposed on the back surface of the transparent member. The light-reflecting layer has optical windows each at a position corresponding to a midpoint between the apexes of mutually adjacent convex lenses. The mutually adjacent convex lenses receive light emitted from the planar light source and passed through the corresponding optical windows and direct the light in different directions, respectively.

In one specific example, the transparent member may be a lenticular lens member.

In another specific example, the transparent member may be a microlens array having convex microlenses arranged two-dimensionally.

The light-reflecting layer may comprise a light-reflecting layer portion and a light-absorbing layer portion disposed between the light-reflecting layer portion and the transparent member. The light-absorbing layer portion absorbs light entering the transparent member through the optical windows and reflected from the convex lenses toward the light-reflecting layer portion, thereby preventing diffusion of light in the light-reflecting layer portion.

In addition, the present invention provides a backlight unit including the above-described optical member and a backlight part as the planar light source that emits illuminating light toward the optical member.

The backlight unit may include a lightguide plate and the optical member stacked on top of the backlight part, a light source disposed adjacent to an end edge surface of the lightguide plate to emit light into the lightguide plate, and a prism sheet disposed between the lightguide plate and the optical member to direct the light from the lightguide plate toward the optical member.

In addition, the present invention provides a display apparatus including an image display panel and the above-described backlight unit that is disposed at the back side of the image display panel.

In this case, the image display panel may be a liquid crystal display panel.

The above-described optical member according to the present invention imparts directivity to light emitted from a light-exiting surface thereof and the light is configured to be directed in a plurality of directions. Accordingly, a display apparatus using a backlight unit having this optical member provides a display surface with high luminance when the display panel of the display apparatus is viewed from a plurality of directions at an angle to the directly forward direction. Thus, the display apparatus is suitable for use, for example, as a display of a car navigation system that is demanded to allow a displayed image to be viewed from two directions, i.e. from both the driver's and passenger's seats.

Embodiments of the present invention will be explained below.

BRIEF DESCRIPTION OF THE DRAWINGS

FIG. 1 is a sectional side view of an optical member according to an embodiment of the present invention.

FIG. 2 is a plan view of the optical member.

FIG. 3 is a schematic sectional side view of a display apparatus having the optical member.

FIG. 4a is a plan view of a backlight unit having the optical member in FIG. 1 and used in the display apparatus shown in FIG. 3.

FIG. 4b is a side view of the backlight unit.

FIG. 5 is an enlarged schematic view for explaining directivity characteristics of the display apparatus.

FIG. 6 is a graph showing the results of a directivity characteristic simulation test of the backlight unit in the display apparatus.

FIG. 7 is a sectional side view of an optical member according to another embodiment of the present invention.

FIG. 8 is a plan view of the optical member in FIG. 7.

FIG. 9 is a schematic sectional side view of a display apparatus having the optical member.

FIG. 10a is a plan view of a backlight unit having the optical member in FIG. 7 and used in the display apparatus shown in FIG. 9.

FIG. 10b is a side view of the backlight unit in FIG. 10a.

FIG. 11 is an enlarged schematic view for explaining directivity characteristics of the display apparatus.

FIG. 12 is a graph showing the results of a directivity characteristic simulation test of the backlight unit in the display apparatus.

FIG. 13 is a fragmentary view of an essential part of an optical member according to still another embodiment of the present invention.

DETAILED DESCRIPTION OF THE INVENTION

FIGS. 1 and 2 show an optical member 1 according to an embodiment of the present invention. The optical member 1 has a lenticular lens member (transparent member) 3, a light-absorbing layer portion 4 disposed on the back surface of the lenticular lens member 3, and a light-reflecting layer portion 5 disposed on the back surface of the light-absorbing layer portion 4.

The lenticular lens member 3 is formed in the shape of a sheet, film or plate from a light-transmitting resin, e.g. an epoxy resin, polyester, polycarbonate, or polyvinyl chloride. The lenticular lens member 3 has on its front surface a plurality of mutually parallel elongated convex lenses 2 having a half-cylindrical shape, i.e. a substantially semicircular cross-section, arranged successively from one edge to the other of the lenticular lens member 3. That is, the lenticular lens member 3 is what is called a micro-lenticular lens array. It should be noted that the material (refractive index, etc.) and thickness of the lenticular lens member 3 are properly set in consideration of the configuration, lens characteristics, strength, etc. of the convex lenses 2.

The light-absorbing layer portion 4 and the light-reflecting layer portion 5 are provided with optical windows 6. The optical windows 6 are formed in the shape of slits with a predetermined width that are parallel to the elongated convex lenses 2 and the center axis 6a of each optical window 6 is configured to pass between the apexes 2a of a pair of mutually adjacent convex lenses 2. In the illustrated embodiment, each convex lens 2 has a focal point on a light-emitting surface of a backlight part (planar light source) 8 shown in FIG. 3.

The light-absorbing layer portion 4 is a black layer of carbon or the like stacked on the back surface of the lenticular lens member 3.

The light-reflecting layer portion 5 is a silver or white metal plate, film, foil or the like having a light-reflecting function, which is stacked on the back surface of the light-absorbing layer portion 4. In this embodiment, the light-reflecting layer portion 5 is a film provided with an evaporated silver layer. It should be noted, however, that an evaporated aluminum layer or the like may be used in place of the evaporated silver layer.

As shown in FIG. 3, a display apparatus 30 includes a backlight unit 7 having the above-described optical member 1 and a backlight part 8 as a planar light source that emits light toward the optical member 1. The display apparatus 30 further includes a liquid crystal display panel (image display panel) 13.

The backlight part 8 has a lightguide plate 9, a light source 10, a prism sheet 11, a reflecting sheet 12, and a casing 90. The optical member 26 is stacked on the backlight part 8. The light source 10 is disposed adjacent to a side edge surface of the lightguide plate 9 to emit light into the lightguide plate 9. The prism sheet 11 is disposed between the lightguide plate 9 and the optical member 1. The reflecting sheet 12 is disposed underneath the lightguide plate 9.

The prism sheet 11 is a transparent sheet-shaped member for collecting light from the lightguide plate 9 upwardly and has on its back side a plurality of elongated prisms 14 with ridges 14a extending parallel to each other. The optical axis of the light source 10 is set parallel to a direction perpendicular to the ridges 14a of the prisms 14 to increase the upward directivity of exiting light from the prism sheet 11. It should be noted, however, that the optical axis of the light source 10 need not necessarily be parallel to a direction perpendicular to the ridges 14a of the prisms 14.

The lightguide plate 9 is formed from a transparent polycarbonate or acrylic resin, for example.

The reflecting sheet 12 is formed from a metal plate, film, foil or the like having a light-reflecting function. In this embodiment, a film provided with an evaporated aluminum layer is used as the reflecting sheet 12.

The light source 10 comprises a plurality of spaced white light-emitting diodes (LEDs). The white LEDs are each formed by sealing a semiconductor light-emitting element on a substrate with a resin material. The semiconductor light-emitting element is, for example, a blue (wavelength $\lambda$: 470 to 490 nm) LED element or an ultraviolet (wavelength $\lambda$: less than 470 nm) LED element, which is formed, for example, by stacking a plurality of semiconductor layers of a gallium nitride compound semiconductor (e.g. InGaN compound semiconductor) on an insulating substrate, e.g. a sapphire substrate.

The resin material used to seal the semiconductor light-emitting element is formed by adding, for example, a YAG fluorescent substance into a silicone resin as a main component. The YAG fluorescent substance converts blue or ultraviolet light from the semiconductor light-emitting element into yellow light, and white light is produced by color mixing effect. It should be noted that various LED elements in addition to those described above can be used as the white LEDs.

The liquid crystal display panel 13 is a transmissive or semitransmissive type liquid crystal display panel. For example, the liquid crystal display panel 13 in this embodiment is of the semitransmissive type and has a panel body 25 having a liquid crystal material L sealed with a sealant 24 in a gap between an upper substrate 22 and a lower substrate 23. A semitransmitting-reflecting sheet 26 having both light-transmitting and—reflecting functions is disposed underneath the panel body 25. As the liquid crystal material L, for example, TN liquid crystal or STN liquid crystal may be used. The upper substrate 22 comprises an upper transparent substrate 22a made of glass, for example. An upper transparent electrode layer 22b made of an ITO (Indium Tin Oxide) film is disposed on a lower surface of the upper transparent substrate 22a. An upper alignment film 22c is disposed on the lower surface of the upper transparent electrode layer 22b. The upper alignment film 22c is formed by applying an alignment treatment to a transparent polyimide resin film or the like. In addition, an upper polarizer 22d is disposed on the upper surface of the upper transparent substrate 22a.

The lower substrate 23 comprises a lower transparent substrate 23a made of glass, for example. A lower transparent electrode layer 23b made of an ITO film is disposed on the upper surface of the lower transparent substrate 23a. A lower alignment film 23c is disposed on the upper surface of the lower transparent electrode layer 23b. The lower alignment film 23c is formed by applying an alignment treatment to a transparent polyimide resin film, for example. In addition, a lower polarizer 23d is disposed on the lower surface of the lower transparent substrate 23a.

The semitransmitting-reflecting sheet 26 may be an aluminum-evaporated sheet configured to have light-transmitting properties, or a reflective polarizer, for example. It should be noted that a spacer (not shown) comprising silica balls or plastic balls, for example, is dispersedly disposed in the gap between the upper and lower substrates 22 and 23, thereby ensuring a desired amount of gap.

In the backlight unit 7 of this embodiment, which comprises the optical member 1 and the backlight part 8, as shown in FIG. 5, exiting light from the backlight part 8 passes through each optical window 6 and is directed in two different directions by a pair of mutually adjacent convex lenses 2 above the optical window 6. In this state, the exiting light is emitted toward the liquid crystal display panel 13 above the backlight unit 7.

FIG. 6 shows the directivity characteristics of exiting light from the backlight unit 7.

We performed a simulation test to evaluate the directivity characteristics of exiting light from the backlight unit 7, which comprises the optical member 1 and the backlight part 8, in this embodiment. It will be understood from the simulation results shown in FIG. 6 that the exiting light from the backlight unit 7 is symmetrically distributed with respect to the directly forward direction in a ZY plane (i.e. a plane perpendicular to a direction in which the convex lenses 2 extend) and has two directivity characteristics having peaks at radiation angles of 30° and −30°, respectively. As will be clear from FIG. 6, it is possible to obtain high directivity in two predetermined directions, and there is substantially no leakage of light in directions other than the predetermined directions. Accordingly, when the surface of the liquid crystal display panel 13 that transmits light having such directivity characteristics is viewed from a direction other than the two predetermined directions, the luminance of the display panel surface is extremely low.

The light-absorbing layer portion 4 can absorb light reflected from the boundary surfaces between the convex lenses 2 and thus suppress scattering. In this regard also, there is a minimal leakage of light in directions other than the above-described two directions. Thus, high directivity characteristics can be obtained.

In the optical member according to the illustrated embodiment, the optical windows 6 are each positioned directly under a midpoint between a pair of mutually adjacent convex lenses 2. Therefore, it is possible to obtain such directivity that exiting light from the backlight unit 7 is directed symmetrically in two directions by each pair of mutually adjacent convex lenses 2, which are in symmetry with respect to the center axis 6a of the associated optical window 6.

In a case where the liquid crystal display apparatus according to the present invention is installed in the center of the instrument panel of a vehicle, for example, if the convex lenses 2 of the optical member are configured to extend in the vertical direction, light transmitted through the liquid crystal display panel 13 has directivity in left and right oblique directions from the center of the liquid crystal display panel 13. Accordingly, it is possible to obtain a display screen of high luminance when the liquid crystal display panel 13 is viewed from the directions of the driver's and passenger's seats.

FIGS. 7 and 8 show an optical member 101 according to another embodiment of the present invention.

The optical member 101 is substantially the same as the above-described optical member 1, except that the optical member 101 has microlenses 102 in the shape of microscopic spherical convex lenses arranged in a matrix and that optical windows 106 are circular holes each formed between a pair of convex microlenses 102 adjacent to each other in the Z direction as viewed in FIGS. 7 and 8. Therefore, constituent elements of the optical member 101 are denoted by reference numerals in the order of 100, and the same constituent elements as those of the optical member 1 are denoted by reference numerals that are the same in the first digit as those used in the foregoing embodiment. A detailed description of the optical member 101 is omitted herein.

FIG. 12 shows the directivity characteristics of exiting light from the backlight unit 107.

We performed a simulation test to evaluate the directivity characteristics of exiting light from the backlight unit 107, which comprises the optical member 101 and the backlight part 108, in this embodiment. It will be understood from the simulation results shown in FIG. 12 that the exiting light from the backlight unit 107 is symmetrically distributed with respect to the directly forward direction in a ZY plane (i.e. a plane perpendicular to a direction X in which the convex microlenses 102 are arrayed) and has two directivity characteristics having peaks at radiation angles of 30° and −30°, respectively. As will be clear from FIG. 12, it is possible to obtain high directivity in two predetermined directions, and there is substantially no leakage of light in directions other than the predetermined directions. Accordingly, when the surface of the liquid crystal display panel 113 that transmits light having such directivity characteristics is viewed from a direction other than the two predetermined directions, the luminance of the display panel surface is extremely low.

In the optical member according to this embodiment, the optical windows 106 are each positioned directly under a midpoint between a pair of mutually adjacent convex microlenses 102. Therefore, it is possible to obtain such directivity that exiting light from the backlight unit 107 is directed symmetrically in two directions by each pair of mutually adjacent convex microlenses 102, which are in symmetry with respect to the center axis 106a of the associated optical window 106. Accordingly, a high luminance similar to that in the first-described embodiment can be obtained in two symmetric oblique directions with respect to the directly forward direction relative to the display screen, for example, forward obliquely leftward and rightward directions, or forward obliquely upward and downward directions.

FIG. 13 shows an essential part of an optical member 201 according to still another embodiment of the present invention. In this embodiment, optical windows 206 are each disposed so that a center axis 206a thereof passes through the center between the apexes 202a of four mutually adjacent convex microlenses 202.

In this embodiment, illuminating light passing through each optical window 206 serving as a pinhole is given directivity in four predetermined directions by the four convex microlenses 202. Accordingly, when the optical member 201 is viewed from four predetermined directions (e.g. obliquely upward, downward, leftward and rightward directions) other than the directly forward direction, it provides a light-exiting surface of high luminance. Thus, it is possible to obtain directivity in a plurality of desired directions according to the positional relationship between a plurality of convex microlenses 202 and optical windows 206.

Although some embodiments of the present invention have been described above, the present invention is not necessarily limited to the foregoing embodiments but can be modified in a variety of ways without departing from the scope of the present invention.

For example, in the embodiment shown in FIGS. 1 and 2, the light-absorbing layer portion 4 and the light-reflecting layer portion 5 are stacked on the back side of the lenticular lens member 3. However, the light-absorbing layer portion 4 and the light-reflecting layer portion 5 may be formed as discrete sheet- or film-shaped members and provided on the back side of the lenticular lens member 3.

Although it is preferable to use white LEDs as the light source 10, as has been stated above, a linear fluorescent tube light source or the like may also be used as the light source 10.

Although in the foregoing embodiments the liquid crystal display panel 13 or 113 is used as an image display panel, other types of image display panels may be used, for example, an electronic paper.

Further, the backlight unit may use various arrangements in addition to the above. For example, in the above-described embodiments, the backlight unit omits a diffusing sheet, which is a member for making light emitted from the light-guide plate even more uniform. However, such a diffusing sheet may be disposed over the lightguide plate of the backlight unit. Although the above-described embodiments use a single prism sheet, it is possible to use two prism sheets (i.e. two prism sheets disposed such that the ridges of their prisms intersect each other in plan view).

Although in the embodiment shown in FIGS. 6 and 7 a plurality of convex microlenses 102 are arranged in a matrix, the convex microlenses 102 may be arranged in a zigzag or other pattern.

Although the foregoing embodiments use convex microlenses 102 or 202 that are circular in plan view, it is also possible to use convex microlenses that are quadrilateral in plan view like fly-eye lenses. Further, the configuration of the convex microlenses 102 or 202 is not necessarily limited to the above-described substantially semicircular sectional shape but may be other convex lens configurations, provided that the desired light-collecting effect can be obtained.

The invention claimed is:

1. An optical member comprising:
a transparent member having a back surface disposed parallel to a planar light source and a front surface opposite to the back surface, the transparent member having a plurality of convex lenses formed on the front surface; and
a light-reflecting layer disposed on the back surface of the transparent member;
the light-reflecting layer having optical windows each at a position corresponding to a midpoint between apexes of mutually adjacent ones of the convex lenses;
the mutually adjacent convex lenses configured to receive light emitted from the planar light source and passed through the corresponding optical window and direct the light in different directions, respectively.

2. The optical member of claim 1, wherein the transparent member is a lenticular lens member.

3. The optical member of claim 1, wherein the transparent member is a microlens array having convex microlenses arranged two-dimensionally.

4. The optical member of claim 1, wherein the light-reflecting layer comprises a light-reflecting layer portion and a light-absorbing layer portion disposed between the light-reflecting layer portion and the transparent member.

5. The optical member of claim 2, wherein the light-reflecting layer comprises a light-reflecting layer portion and a light-absorbing layer portion disposed between the light-reflecting layer portion and the transparent member.

6. The optical member of claim 3, wherein the light-reflecting layer comprises a light-reflecting layer portion and a light-absorbing layer portion disposed between the light-reflecting layer portion and the transparent member.

7. A backlight unit comprising:
the optical member of claim 1;
a lightguide plate disposed adjacent to the back surface of the optical member;
a light source disposed adjacent to an end edge surface of the lightguide plate and configured to emit light into the lightguide plate; and
a prism sheet disposed between the lightguide plate and the optical member and configured to direct the light from the lightguide plate toward the optical member.

8. A backlight unit comprising:
the optical member of claim 2;
a lightguide plate disposed adjacent to the back surface of the optical member;
a light source disposed adjacent to an end edge surface of the lightguide plate and configured to emit light into the lightguide plate; and
a prism sheet disposed between the lightguide plate and the optical member and configured to direct the light from the lightguide plate toward the optical member.

9. A backlight unit comprising:
the optical member of claim 3;
a lightguide plate disposed adjacent to the back surface of the optical member;
a light source disposed adjacent to an end edge surface of the lightguide plate and configured to emit light into the lightguide plate; and
a prism sheet disposed between the lightguide plate and the optical member and configured to direct the light from the lightguide plate toward the optical member.

10. A backlight unit comprising:
the optical member of claim 4;
a lightguide plate disposed adjacent to the back surface of the optical member;
a light source disposed adjacent to an end edge surface of the lightguide plate and configured to emit light into the lightguide plate; and
a prism sheet disposed between the lightguide plate and the optical member and configured to direct the light from the lightguide plate toward the optical member.

11. A backlight unit comprising:
the optical member of claim 5;
a lightguide plate disposed adjacent to the back surface of the optical member;
a light source disposed adjacent to an end edge surface of the lightguide plate and configured to emit light into the lightguide plate; and
a prism sheet disposed between the lightguide plate and the optical member and configured to direct the light from the lightguide plate toward the optical member.

12. A backlight unit comprising:
the optical member of claim 6;
a lightguide plate disposed adjacent to the back surface of the optical member;
a light source disposed adjacent to an end edge surface of the lightguide plate and configured to emit light into the lightguide plate; and
a prism sheet disposed between the lightguide plate and the optical member and configured to direct the light from the lightguide plate toward the optical member.

13. A backlight unit comprising:
the optical member of claim 1; and
a backlight part as the planar light source that emits illuminating light toward the optical member.

14. A display apparatus comprising:
an image display panel; and
the backlight unit of claim 7 that is disposed at a back side of the image display panel.

15. A display apparatus comprising:
an image display panel; and
the backlight unit of claim 8 that is disposed at a back side of the image display panel.

16. A display apparatus comprising:
an image display panel; and
the backlight unit of claim 9 that is disposed at a back side of the image display panel.

17. A display apparatus comprising:
an image display panel; and
the backlight unit of claim 10 that is disposed at a back side of the image display panel.

18. A display apparatus comprising:
an image display panel; and
the backlight unit of claim 11 that is disposed at a back side of the image display panel.

19. A display apparatus comprising:
an image display panel; and
the backlight unit of claim 12 that is disposed at a back side of the image display panel.

20. A display apparatus comprising:
an image display panel; and
the backlight unit of claim 13 that is disposed at a back side of the image display panel.

* * * * *